US006978047B2

(12) United States Patent
Montgomery

(10) Patent No.: US 6,978,047 B2
(45) Date of Patent: Dec. 20, 2005

(54) METHOD AND APPARATUS FOR STORING DIGITAL VIDEO CONTENT PROVIDED FROM A PLURALITY OF CAMERAS

(75) Inventor: Dennis L. Montgomery, Reno, NV (US)

(73) Assignee: eTreppid Technologies LLC, Reno, NV (US)

( * ) Notice: Subject to any disclaimer, the term of this patent is extended or adjusted under 35 U.S.C. 154(b) by 553 days.

(21) Appl. No.: 09/991,527

(22) Filed: Feb. 22, 2002

(65) Prior Publication Data

US 2003/0161539 A1 Aug. 28, 2003

Related U.S. Application Data

(63) Continuation-in-part of application No. 09/727,096, filed on Nov. 29, 2000.

(51) Int. Cl.[7] .............................................. G06K 9/36
(52) U.S. Cl. ..................................................... 382/235
(58) Field of Search ................................ 382/100, 173, 382/181, 232, 235, 209; 386/109, 123, 124; 707/6, 101; 375/240, 240.26; 348/384.1, 348/390.1

(56) References Cited

U.S. PATENT DOCUMENTS

| | | | |
|---|---|---|---|
| 4,841,366 A | | 6/1989 | Katagiri et al. |
| 5,533,051 A | | 7/1996 | James |
| 5,583,562 A | * | 12/1996 | Birch et al. ................. 725/151 |
| 5,586,280 A | | 12/1996 | Simms et al. |
| 5,805,932 A | | 9/1998 | Kawashima |
| 5,870,087 A | | 2/1999 | Chau |
| 5,892,966 A | | 4/1999 | Petrick |
| 5,901,246 A | * | 5/1999 | Hoffberg et al. ............ 382/209 |
| 6,011,901 A | * | 1/2000 | Kirsten ....................... 386/123 |
| 6,043,897 A | | 3/2000 | Morikawa |
| 6,064,764 A | * | 5/2000 | Bhaskaran et al. ......... 382/183 |
| 6,212,657 B1 | * | 4/2001 | Wang et al. ................ 714/746 |
| 6,275,615 B1 | * | 8/2001 | Ida et al. .................... 382/232 |
| 6,363,381 B1 | * | 3/2002 | Lee et al. ....................... 707/6 |
| 6,366,289 B1 | | 4/2002 | Johns |
| 6,374,266 B1 | | 4/2002 | Shnelvar |
| 6,404,928 B1 | * | 6/2002 | Shaw et al. ................. 382/232 |
| 6,507,618 B1 | * | 1/2003 | Wee et al. ............. 375/240.16 |
| 6,594,687 B1 | * | 7/2003 | Yap et al. ................... 709/203 |
| 6,807,310 B1 | * | 10/2004 | Dugad et al. ............... 382/248 |
| 2003/0081146 A1 | | 5/2003 | Montgomery | |

FOREIGN PATENT DOCUMENTS

| | | |
|---|---|---|
| EP | 0729237 | 8/1996 |
| WO | WO 94/22072 | 9/1994 |
| WO | WO 97/06602 | 2/1997 |

(Continued)

OTHER PUBLICATIONS

Ageenko Forward Adaptive Modeling for Context-Based Compression of Large Binary Images in Applications Requiring Spatial Access, Image Proc. 1999, ICIP 99, Procs 1999 Int'l Conf. on Kobe Japan Oct. 24-28, 1999, IEEE, pp. 757-761.

(Continued)

*Primary Examiner*—Jose L. Couso
(74) *Attorney, Agent, or Firm*—Pillsbury Winthrop Shaw Pittman LLP

(57) ABSTRACT

The present invention provides a distributed surveillance system that allows for the digital storage of data, as well as the recognition of external patterns obtained in parallel operations. Further, digital data can be stored at different levels of compression, and pattern recognition achieved while the digital data is still in its compressed form.

25 Claims, 2 Drawing Sheets

FOREIGN PATENT DOCUMENTS

| WO | WO 98/39699 | 9/1998 |
|----|-------------|--------|
| WO | WO 00/45516 | 8/2000 |
| WO | WO 01/20489 | 3/2001 |

OTHER PUBLICATIONS

Bshouty et al., "Compression of Dictionaries via Extensions to Front Coding," Computing and Information, 1992, Proc. ICCI 92, 4th Int'l Conf, Toronto Canada, May 28-30, 1992); IEEE Comput Soc, US, pp. 361-364.

Chan, "Review of Block Matching Based Motion Estimation Algorithms for Video Compression", Elec. And Comp Eng, 1993. Canadian Conf—Vancouver, BC, Sep. 14-17, 1993, USA, IEEE, pp. 151-154.

Dufaux, "Motion Estimation Techniques for Digital TV: A Review and a New Contribution" Proc. Of IEEE, 83:6, (Jun. 1995), pp. 858-875.

Haan, "Progress in Motion Estimation for Consumer Video Format Conversion", IEEE Transaction on Cons. Elect., 46:3, (Aug. 2000), pp. 449-459.

Hsu, "Automatic Synthesis of Compression Techniques for Heterogeneous Files" Software Prac. And Exp., 25:10, (Oct. 1995), p. 1097-1116.

In Brief: VLSI Universal Noiseless Coder, NTIS Tech Notes (Mar. 1990), p. 234.

In Brief: "Competitive Parallel Processing for Compression of Data", NTIS Techn Notes, (May 1990), p. 379.

Stiller, "Estimating Motion in Image Sequences in Tutorial On Modeling and Computation of 2D Motion", IEEE Sig. Proc. Mag., 16:4, (Jul. 1999), pp. 70-91.

Yokoyama, "Very Low Bit Rate Viseo Coding Using Arbitrarily Shaped Region-Based Motion Compensation", IEEE Trans on Cir and Sys for Video Tech, 5:6, (Dec. 2, 1995), pp. 500-507.

Chan et al., "Review of Block Matching Based Motion Estimation Algorithms for Video Compression:," IEEE, vol. 17 (No. 93), p. pp. 151-154, (Sep. 14, 1993).

De Haan et al., "" Progress in Motion Estimation for Consumer Video Format Conversion"," IEEE, vol. 46 (No. 3), p. pp. 449-459, (Aug. 2000).

Dufaux et al., ""Motion Estimation Techniques for Digital TV: A Review and a New Contribution"," IEEE, vol. 83 (No. 6), p. pp. 858-875, (Jun. 6, 1995).

Stiller, ""Estimating Motion in Image Sequences"," IEEE, vol. 16 (No. 4), p. pp. 70-91, (Jul. 1999).

Yokoyama et al., ""Very Low Bit Rate Video Coding Using Arbitrarily Shaped Region-based Motion Compensation"," IEEE, vol. 5 (No. 6), p. pp. 500-507, (Dec. 21, 1995).

* cited by examiner

| Modules 210 | |
|---|---|
| local front end processing module 210-1 | |
| local pattern recognition module 210-2 | network pattern recognition module 210-12 |
| local multi-pass module 210-3 | network multi-pass module 210-13 |
| local encryption/decryption module 210-4 | network encryption/decryption module 210-14 |
| local user interface module 210-5 | network interface module 210-15 |
| local priority data storage module 210-6 | network priority data storage module 210-16 |

Figure 2

METHOD AND APPARATUS FOR STORING DIGITAL VIDEO CONTENT PROVIDED FROM A PLURALITY OF CAMERAS

This application is a continuation-in-part of U.S. application Ser. No. 09/727,096 entitled "Method And Apparatus For Encoding Information Using Multiple Passes And Decoding In A Single Pass" filed on Nov. 29. 2000.

FIELD OF THE INVENTION

The present invention relates a method and apparatus for storing digital video content provided from a plurality of cameras.

BACKGROUND OF THE RELATED ART

Surveillance cameras are extremely well known and used to help deter theft, crime and the like.

It is also well known to store as a sequence of images on some type of medium the event that the surveillance camera is recording. Conventionally, such storage has been done using VCR's, and storing the images obtained from the event on a tape. Such a storage medium, however, has the disadvantage of requiring the frequent removal of and old tape and insertion of a new tape every few hours, which, when many cameras are being used, is a time consuming and tedious process. Further disadvantages occur since it is difficult to authenticate the recording stored on the tape. Still further, as a result of tapes degrading over time, as well as then typically being played back on a player different from that which recorded the tape, the resulting sequence of images may not be clear.

The storage of images obtained from such events in digital form has also been contemplated. In such a system, images from the event recorded by the camera are converted to digital form, and have been compressed in some manner, such as using the known MPEG format. To date, however, such systems have not proved feasible for a variety of reasons. In situations requiring many cameras simultaneously the bandwidth required as a result of all of the cameras being used has prevented storage of images over a period of time that is long enough and which has sufficient resolution to decrease the overall cost of information storage to a point that digital storage is economical.

One conventional approach to this problem is to begin recording when movement of some type is detected, so that otherwise still images are not continuously recorded, thus reducing the storage requirements necessary for operation of the system. Usage of such event initiation indicators in this manner introduce problems of their own, such as, for example, not having a continuous record.

An improved surveillance system is thus desirable.

SUMMARY OF THE INVENTION

The present invention provides a distributed surveillance system that allows for the digital storage of data, as well as the recognition of external patterns obtained in parallel operations. Further, digital data can be stored at different levels of compression, and pattern recognition achieved while the digital data is still in its compressed form.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent similar parts of the present invention throughout several views and wherein:

FIG. 2 illustrates a block diagram of software modules used by different processors according to the present invention.

DETAILED DESCRIPTION OF THE PREFERRED EMBODIMENTS

Figure 1:
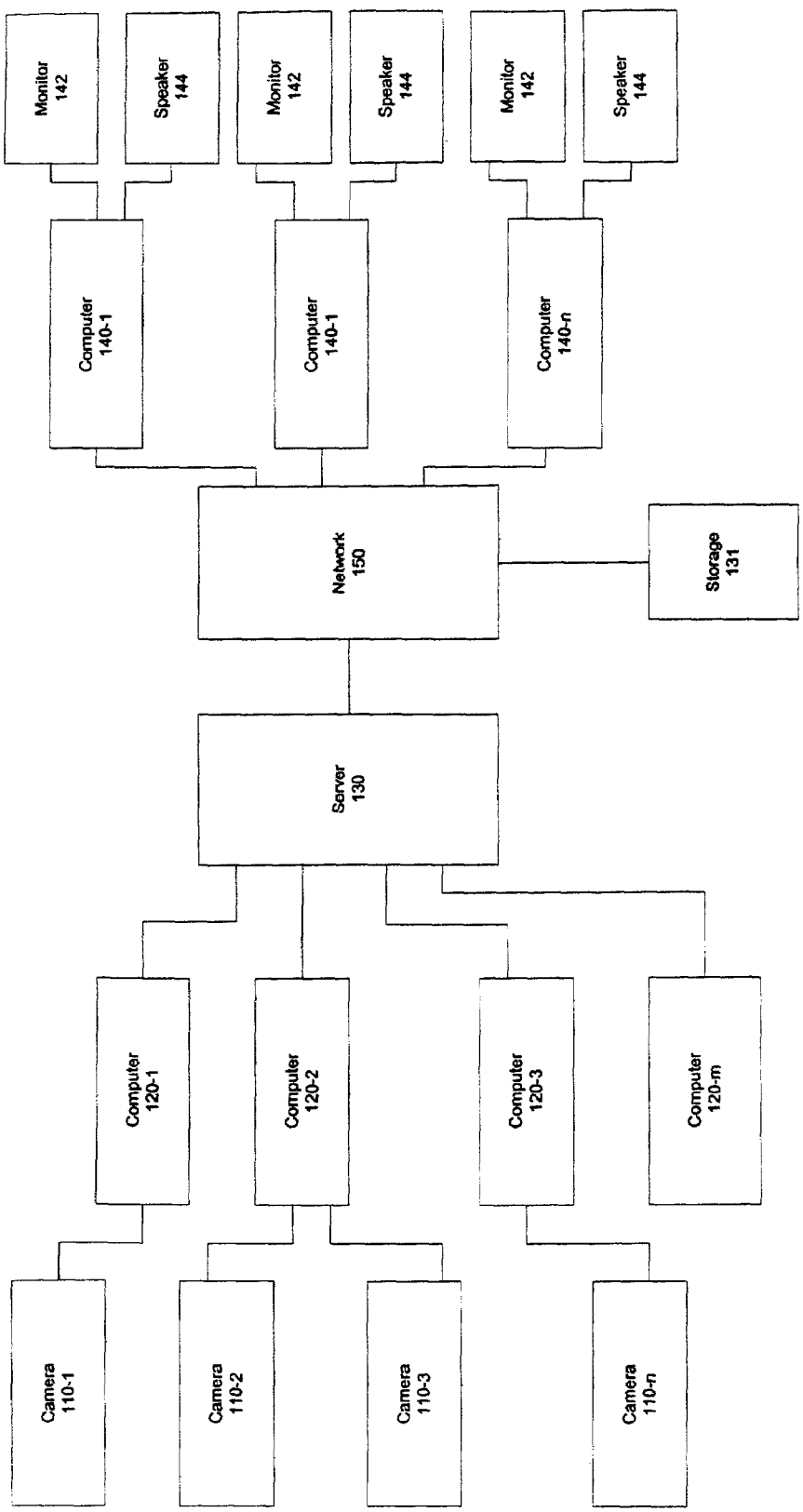
FIG. 1 illustrates a block diagram of the digital video content storage system according to the present invention.

The present invention provides a distributed surveillance system and methods of using the system. Features included are digital storage of surveillance information, both visual and audible, pattern recognition of external patterns within obtained streams of surveillance information from different sources, distributing external patterns to various computer locations where such external patterns can be used for searching, interpreting automatically patterns of repetitive activity and generating reports therefrom, distributing individual images that are automatically determined to contain a particular image of interest, establishing pattern recognition rules to detect activity of interest, as well as others described herein.

The present invention is implemented using a combination of hardware and software elements. FIG. 1 illustrates an exemplary system 100 according to the present invention, and various different devices that will allow for the various permutations described herein to be understood, although it is understood that this exemplary system 100 should not be construed as limiting the present invention. FIG. 1 illustrates a plurality of conventional cameras 110-1 to 110-n, analog or digital, each of which is connected to a computer 120-1 to 12-m and preferably contains systems for detecting both images and sound. The connections between the cameras 110 and the computers 120 can be many, being shown as both connected in a one-to-one correspondence, as well as a number of the cameras 110 being connected to a single computer 120. Further, a computer 120 is also shown as not being connected to any camera, to illustrate that digital data stored in any digital format can be operated upon by the present invention, such as being stored on a computer.

The computers 120 are each preferably coupled using a network 150 of some type, such as the Internet or a private network, to a central server 130. Each of the computers 120, and the cameras 110 connected thereto, can be in any number of disparate locations. While the computer 120 connected to a camera 110 are preferably within or close to the same building in order to minimize the distance that signals from the camera 110 must travel until they reach the computer 120, the cameras can be on different floors of the same building, and the computers 120 can be within different buildings. And while the system is illustrated for convenience herein as having a single central server 130, it will be appreciated that any or all of the computers 120 could be configured to act as the central server described herein. It should be understood, however, that it is advantageous to have the central server 130 at a location that is remote from the location where the surveillance is being performed, and even more preferable to have that remote location be in a physically separate building. In typical operation, a particular company may have its own server 130, and, if desired, each of different servers 130 can be connected together through the network 150 to permit sharing of certain data therebetween. In the discussion that follows, however, the system 100 will be described with reference to a single server 130, which can server a multitude of different companies, to illustrate the most flexible aspects of the system 100 described herein.

Furthermore, as illustrated, a variety of other computers 140-1 to 140-n, each containing a monitor 142, are also illustrated as being coupled to the server 130 through the network 150. Data received by computers 140 can be decrypted and decoded for subsequent usage, such as being perceived visibly using monitor 142 and audibly using speaker 144 shown.

This particular exemplary system 100 thus allows the cameras 110 to provide at least images, and sound if desired, which can be encoded and stored for surveillance purposes. This data can be stored in digital form on a computer 120 or a computer 130, as described further hereinafter. Further, patterns within images or sound obtained from cameras 110 that compare to external patterns can also be recognized, as will be described further herein, using either the computer 120 provided with the image data from the camera 110, the server 130, or both.

Transmission of data between each computer 120 or 140 and server 130 is also preferably encrypted, as described further hereinafter. For data transmitted to computers 120, 140 or server 130, the data is decrypted in order to operate on it.

While the above network is provided to illustrate one manner in which the advantages of the present invention described herein can be used, this is exemplary. For example, each of the different computers 120, 130 and 140 could be implemented as a single computer and devices other than computers that contain processors that are able to implement the inventions described herein can be used instead. Many other variants are possible. And while a device such as mentioned will typically include a processor of some type, such as an Intel Pentium 4 microprocessor or a DSP in conjunction with program instructions that are written based upon the teachings herein, other hardware that implements the present invention can also be used, such as an field programmable gate array. The program instructions are preferably written in C++ or some other computer programming language. For repetitive routines that are used repeatedly, these can be written in assembler for faster processing.

FIG. 1, illustrated and described previously, describes the hardware elements of the surveillance system 100 according to the present invention. The present invention also includes software 200 that is resident on each of the computers 120 and 140, as well as the server 130, to provide for the variety of functions described herein. It will be appreciate that various modules 210 of the software 200 are resident on different computers, thereby allowing for the functions as described herein to be achieved.

One aspect of software 200 is that the modules are preferably comprised of functionalities that allow interoperability therebetween, as discussed hereinafter. That this interoperability is possible will become apparent in the discussion that follows. In this regard, as shown by FIG. 2, modules 210 that are typically contained within and operate in conjunction with the computers 120 are:

local front end processing module 210-1;
    local pattern recognition module 210-2, which, as described hereinafter, allows for both internal pattern recognition and external pattern recognition as described hereinafter;
    local multi-pass module 210-3;
    local encryption/decryption module 210-4;
    local user interface module 210-5; and
    local priority data storage module 210-6.

Modules 210 that are typically contained within and operate in conjunction with the server 130 are:
    network pattern recognition module 210-12, which, as described hereinafter, allows for both internal pattern recognition and external pattern recognition, and includes network priority information, event alert generation, and repetitive action pattern analysis and associated report generation, as described hereinafter;
    network multi-pass module 210-13;
    network encryption/decryption module 210-14;
    network interface module 210-15; and
    network priority data storage module 210-16.
    Each of the modules described above will be further discussed so that operation of the system 100 is understood.

Local front end processing module 210-1, local user interface module 210-5. and network interface module 210-15

The local front end processing module 210-1, local user interface module 210-5. and network interface module 210-15 will first be described. As described generally above, the surveillance system 100 according to the present invention allows for recording devices, typically cameras 110, to be placed at various locations associated with a building, and allows for buildings at disparate locations to be served. Accordingly, in the preferred embodiment, each building will contain at least one local computer 120, although the number of local computers needed will vary depending upon the amount of processing power desired relative to the number of recording devices and other processing operations that take place at the location itself. In this regard, the local user interface module 210-5 is used to set up and keep track of connections between cameras that are included on the local system. Thus, a single local interface module, typically associated with a single company, will keep track of company information, camera information, and user information.

Company information tracked will typically include the company name, and the address information for each building of which surveillance is required.

Camera information, that is associated with a particular building, includes the model of the camera, a camera priority, a camera identifier that can be used by both the local system as well as the network system, the location of the camera, which can include not only a location that it views, but reference to a particular activity, such as a particular gaming table number in an embodiment for usage at a casino, a gaming type identifier if the camera is used for a gaming table, an operation status identifier (functioning or out-of-service), and a camera purpose identifier, which can be, for example in the context of usage at a casino, whether the camera is used for gaming or non-gaming purposes. How these are used will be further described hereinafter.

User information identifies users who can access the system, and the degree of access that they have to the system. Certain users will have view access only, which may be of only certain views or all views, while other users will have access to make changes, run reports, and the like as described further herein.

With respect to the set-up of each camera, the individual camera 110 not only needs to be set-up and connected with the system using the local user interface module 210-5, but also needs to be configured to operate properly. In this regard, the local front end processing module 210-1 is preferably used to properly configure the camera to operate as effectively as it can. Configuring the individual camera 110 using the local user interface module 210-5 is described in U.S. patent application Ser. No. 09/991,528 filed Nov. 21, 2001 entitled "Method And System For Size Adaptation And Storage Minimization, Source Noise Correction, And Source Watermarking Of Digital Data Frames", which is assigned to the same assignee as the present invention, the contents of which are hereby expressly incorporated by reference herein.

The local user interface module 210-5 is also configured to transmit the information relating to the local system to the network interface module 210-15. It is understood that the network interface module 210-15 will preferably contain the same information as exists with respect to each different local user interface module 210-5. In addition, since the network interface module 210-15 receives information from a multitude of different computers 120, the network interface module 210-15 will also include network related features, such as network establishment of network external patterns desired for pattern recognition as described further herein, network camera priority rules, network back-up procedures, and network report generation. The manner in which these various local and network features are implemented will be described hereinafter, but it will be understood that the local user interface module 210-5 and the network interface module 210-15 together allow for access to the results of the operations performed by the other modules 210 described hereinafter.

With respect to local and network camera priority rules that are for convenience discussed with the local user interface module 210-5 and network interface module 210-15, as mentioned above the local user interface module 210-5, when setting up a camera, will establish a priority of that camera, which priority scheme can take many different forms, one being a 0–10 priority, with 0 being the highest priority and 10 being the lowest priority. In addition to the local priority setting, there may be another network priority setting, thus ensuring that certain types of data are transmitted from the computer 120 to the server 130. Thus network camera priority settings also exist, which cause the network interface module 210-15 to initiate transfers of data from certain cameras 110 at a higher priority than other cameras 110.

Local Pattern Recognition Module 210-2 and Network Pattern Recognition Module 210-12

The local pattern recognition module 210-2 and network pattern recognition module 210-12 each provide for the capability to recognize patterns within data. Typically, that data includes image data that is formatted in frames. Patterns recognized include patterns within the data, as well as external patterns that are externally generated and being searched for within the data, as described further hereinafter.

Both the local pattern recognition module 210-2 and network pattern recognition module 210-12 can use a variety of pattern recognition techniques, but preferably use pattern recognition techniques as described in U.S. application No. 09/999,776 entitled "Method And Apparatus For Determining Patterns Within Adjacent Blocks Of Data," filed on Oct. 31, 2001, which is assigned to the same assignee as the present invention, can be used to perform pattern recognition and compression, and the contents of which are expressly incorporated by reference herein.

Differences between the local pattern recognition module 210-2 and the network pattern recognition module 210-12 exist. One significant difference, typically, is that while the local pattern recognition module 210-2 typically operates upon uncompressed data as described in U.S. applicaton Ser. No. 09/999,776 filed on Oct. 31, 2001 entitled "Method And Apparatus For Determining Patterns Within Adjacent Blocks Of Data" reference above, the network pattern recognition module 210-12 will operate upon data in a compressed form.

Specifically, the network pattern recognition module 210-12 can operate upon data that has been consistently compressed. Compression is preferably achieved using the techniques described in application Ser. No. 09/727,096 entitled "Method And Apparatus For Encoding Information Using Multiple Passes And Decoding In A Single Pass" filed on Nov. 29, 2000. In this compression scheme, as noted in the section below, recorded data can be subjected to multiple passes to achieve further compression.

Both the local pattern recognition module 210-2 and the network pattern recognition module 210-12 also provide for the recognition of external patterns within images that are externally generated. So that external patterns can be detected irrespective of which amount of compression is used, as noted in further detail below, the external patterns are stored at each of the different levels of compression that exist.

The network interface module 210-15, in conjunction with the local pattern recognition module 210-2 and the network pattern recognition module 210-12, is used to identify and keep track external patterns desired for pattern recognition and the priority of that external pattern. In particular, an external pattern will represent an object, which object could be the face of a person, a particular article such as a purse, card, a vehicle or a vehicle license plate. Whatever the object, the present invention will store a representation of that object and compare use that representation to compare with patterns that are within the image recorded.

A limiting factor in the ability of the system 100 to track external patterns is that the system 100 is already obtaining data from various cameras 110 and compressing that data as described above. In order to perform that task alone, substantial processing power is required, leaving only some percentage, based upon the computing power available, to track external patterns of objects. Thus, the network interface module 210-15 will keep track of the priority of each external pattern that will be searched for based upon the input from each camera 110. Certain of the highest priority external patterns are distributed to computers 120 in an uncompressed form, using a sufficient number of points, such as 25, that allows for sufficiently accurate pattern detection in vector form using (x,y) offsets as is known, for pattern recognition that takes place using another processor thread for the purpose of searching for a particular pattern, as described in U.S. application Ser. No. 09/999,776 filed on Oct. 31, 2001 entitled "Method And Apparatus For Determining Patterns Within Adjacent Blocks Of Data" reference above. Lower priority external patterns are retained on the server 130 in compressed form, and are searched for within the server 130 in the manner discussed above.

Since the computers 120 are typically operating upon real-time images that are received, it is apparent that the external patterns located by computers 120 will be obtained more quickly than external patterns found by server 130, which external patterns need not be searched for in real time. If, however, the computer 120 cannot complete its search for external patterns, it will so notify server 130, which will then preferably search for all desired external patterns and assume that the computer 120 did not find any.

Operations using pattern detection, whether using the pattern detection techniques described in U.S. application Ser. No. 09/999,776 filed on Oct. 31, 2001entitled "Method And Apparatus For Determining Patterns Within Adjacent Blocks Of Data" referenced above or other conventional techniques are further described in other applications. These applications include U.S. patent application Ser. No. 09/990,868 filed Nov. 12, 2001 entitled "Method And Apparatus For Detecting And Reacting To Occurrence Of An Event", U.S. patent application Ser. No. 09/991,490 filed Nov. 21, 2001 entitled "System And Method For Generating Alert Conditions In A Surveillance System" and U.S. patent application Ser. No. 09/991,531 filed Nov. 21, 2001 entitled "Data Gathering For Games Of Chance", each of these applications being assigned to the same assignee as the present invention, and the contents of each of these application being expressly incorporated by reference herein. Each of the pattern recognition operations described in these applications can be implemented by the system 100 described herein, if desired.

Local Multi-Pass Module 210-3 and Network Multi-Pass Module 210-13

The local multi-pass module 210-3 and network multi-pass module 210-13 operate to provide further compression from that obtained by the local pattern recognition module 210-2 and network pattern recognition module 210-12. That further compression is preferably achieved using the techniques described in application Ser. No. 09/727,096 entitled "Method And Apparatus For Encoding Information Using Multiple Passes And Decoding In A Single Pass" filed on Nov. 29, 2000, and assigned to the same assignee as the present invention, the contents of which are expressly incorporated by reference herein, or other encoding/decoding processes.

While each of the local multi-pass module 210-3 and network multi-pass module 210-13 can be configured to operate in the same manner, typically that is not the case. Rather, typically, the local multi-pass module 210-3 is configured to perform some predetermined number of passes on the data that it receives in order to partially compress that data before it is transmitted by the computer 120 to the server 130 for further operations, including further compression operations performed by the network multi-pass module 210-13 using further passes to further compress the data. In this regard, it is preferable that each of the local multi-pass modules 210-3 using the same number of passes and the same compression routines, so that the data received by the server and further operated upon using the network multi-pass module 210-13 is already consistently compressed between the various sources from which it receives data. Thus, as is apparent, the network multi-pass module 210-13 will preferably contain additional multi-pass compression routines not found in the local multi-pass modules 210-3 that allow for further passes to occur. Typically, passes 1 and 2 are performed by the computer 120, whereas further passes are performed by the server 130. Further, since the more compression requested the greater the number of passes, and also the slower the system, data can be saved with a user-specified amount of compression. Since images may be recorded at different levels of compression, for each different compression level there must be an associated compression of all of the external patterns. Thus, if images are recorded at one of 1, 2, 5, 10, 15 or 20 passes, then external patterns must be obtained for each of 1, 2, 5, 10, 15 and 20 passes, so that the appropriately compressed external pattern can be used during comparison operations depending upon the compression of the image.

Local Encryption/Decryption Module 210-4 and Network Encryption/Decryption Module 210-14

The local encryption/decryption module 210-4 and network encryption/decryption module 210-14 each perform the same functions—encrypting and transmitting data to a source destination, and receiving and decrypting data that has been previously encrypted and transmitted. While many encryption/decryption techniques exist, one technique that is advantageously implemented is described in U.S. application Ser. No. 09/823,278 entitled "Method And Apparatus For Streaming Data Using Rotating Cryptographic Keys," filed on Mar. 29, 2001, and assigned to the same assignee as the present invention, the contents of which are expressly incorporated by reference herein.

Local Priority Data Storage Module 210-6 and Network Priority Data Storage Module 210-16

The local priority data storage module 210-6 and network priority data storage module 210-16 keep track of the data stored on each of the computers 120 and server 130, respectively. These priority data storage modules are different than data backup, and assume a worst-case scenario that no data backup has occurred. In essence, both the local priority data storage module 210-6 and network priority data storage module 210-16 operate in the same manner —to keep that data which is most important. Specifics on how data is differentiated and these modules operate are described in U.S. application Ser. No. 09/991,487 filed Nov. 21, 2001 entitled "System And Method For Managing Memory In A Surveillance System" and which is assigned to the same assignee as the present invention, the contents of which are expressly incorporated by reference herein.

Also, each local user interface module 210-5 can operate if not connected to the network, with the resident software continuing to perform the functions that it typically would in conjunction with it associated computer 120. The data saved, should prioritizing be necessary, will be in accordance with the patent application referred to in the immediately above paragraph.

Other Environments

The surveillance system as described herein describes security in the context of a casino, which includes gaming tables, vault areas, and other common areas requiring surveillance. It will be understood, however, that the present invention can be implemented in any environment requiring security, including financial institutions, large commercial buildings, jewelry stores, airports, and the like.

In certain buildings, airports and the like, there can be various levels of security established at various locations. At an airport, for instance, the initial gate entry area represents one level of security, and the actual gate can represent another level of security. In a casino, jewelry store, or financial institution, an entry one can represent one level of security and a vault within represent another level of security. Comparisons of images from these related areas, and generating alerts and other information based thereupon, as further described in the applications entitled U.S. patent application Ser. No. 09/990,868 filed Nov. 21, 2001 entitled "Method And Apparatus For Detecting And Reacting To Occurrence Of An Event", U.S. patent application Ser. No. 09/991,490 filed Nov. 21, 2001 entitled "System And Method For Generating Alert Conditions In A Surveillance System", and U.S. patent application Ser. No. 09/991,531 filed Nov. 21, 2001 entitled "Data Gathering For Games Of Chance", referenced above, can be used in these environments. Certain characteristics of each environment can be used in making comparisons. For example, in a jewelry store, comparisons can be made between a mask of an unbroken glass display case, such that if the case breaks, an alert can be sounded.

Adaptation for Wireless Environment

The present invention can also be adapted for surveillance in environments where a wired connection between the computer 120 and the server 130 is not possible, such as on an airplane. In such an environment, the available transmission bandwidth becomes even more of a limiting factor than in a wired network. Accordingly, in such an environment, the computer 120 will typically be limited to performing the compression operations described above and wirelessly transmitting the compressed information, and pattern recognition and other operations will take place at server 130 which is adapted to receive the wirelessly transmitted data.

The embodiments described above have been presented for purposes of explanation only, and the present invention should not be construed to be so limited. Variations on the present invention will become readily apparent to those skilled in the art after reading this description, and the present invention and appended claims are intended to encompass such variations as well.

I claim:

1. A method of providing for digital data storage of a stream of image data and pattern recognition of at least one external pattern and an initially compressed external pattern on the stream of image data comprising the steps of:

compressing a stream of digital image data using at least a first thread to obtain an initially compressed stream of digital image data and performing pattern recognition using the at least one external pattern and at least a second thread to attempt to recognize matches, the first and second threads being processed using a processing system;

transmitting the initially compressed stream of digital image data to another processing system; and further compressing the initially compressed stream of digital image data using at least a third thread to obtain a further compressed stream of digital image data and performing pattern recognition of the at least one external pattern using at least a fourth thread and the initially compressed external pattern to attempt to recognize matches, the third and fourth threads being processed using the another processing system.

2. The method according to claim 1 wherein the step of compressing and performing pattern recognition performs pattern recognition on the stream of digital image data using an uncompressed external pattern.

3. The method according to claim 2 wherein the uncompressed external pattern used in the step of compressing contains at least 25 reference points.

4. The method according to claim 1 wherein the step of further compressing and performing pattern recognition performs pattern recognition on the initially compressed stream of digital image data with the initially compressed external pattern, which initially compressed external pattern corresponds to the at least one external pattern used in the step of compressing.

5. The method according to claim 1 wherein the step of further compressing and performing pattern recognition performs pattern recognition on the initially compressed stream of digital image data with the initially compressed external pattern, which initially compressed external pattern which does not correspond to the at least one external pattern used in the step of compressing.

6. The method according to claim 1 wherein the step of further compressing and performing pattern recognition performs pattern recognition on the initially compressed stream of digital image data with a plurality of initially compressed external patterns.

7. The method according to claim 1 wherein the step of compressing and performing pattern recognition operate on real-time images that form the stream of digital image data.

8. The method according to claim 7 wherein the step of compressing and performing pattern recognition performs pattern recognition on the stream of digital image data using an uncompressed external pattern.

9. The method according to claim 8 wherein the uncompressed external pattern used in the step of compressing contains at least 25 reference points.

10. The method according to claim 7 wherein the step of further compressing and performing pattern recognition performs pattern recognition on the initially compressed stream of digital image data with the initially compressed external pattern, which initially compressed external pattern corresponds to the at least one external pattern used in the step of compressing.

11. The method according to claim 7 wherein the step of further compressing and performing pattern recognition performs pattern recognition on the initially compressed stream of digital image data with the initially compressed external pattern, which initially compressed external pattern does not correspond to the at least one external pattern used in the step of compressing.

12. The method according to claim 7 wherein the step of further compressing and performing pattern recognition performs pattern recognition on the initially compressed stream of digital image data with a plurality of initially compressed external patterns.

13. The method according to claim 7 wherein:

the step of compressing and performing pattern recognition performs pattern recognition on the stream of digital image data with a plurality of external patterns.

14. The method according to claim 13 wherein the step of compressing and performing pattern recognition further includes the step of providing a notification to the another processing system if the step of performing pattern recognition for all the plurality of external patterns was not completed; and wherein the step of further compressing and performing pattern recognition, upon receipt of the notification, performs pattern recognition on the initially compressed stream of digital image data with the plurality of external patterns.

15. The method according to claim 14 wherein the step compressing and performing pattern recognition is performed by a plurality of different processing systems, each processing system operating upon a different stream of image data, to obtain a plurality of streams of initially compressed image data.

16. The method according to claim 15 wherein the step of further compressing and performing operates upon each of the plurality of streams of initially compressed image data.

17. The method according to claim 16 wherein the step of further compressing and performing further compresses each of the plurality of streams of initially compressed image data.

18. The method according to claim 16 wherein the step of further compressing and performing performs pattern recognition on each of the plurality of streams of initially compressed image data using the initially compressed external pattern.

19. The method according to claim 15 wherein the step of compressing and performing pattern recognition performs, for each different processing system, pattern recognition on a corresponding one different stream of image data, using uncompressed external patterns.

20. The method according to claim 19 wherein each uncompressed external pattern used in the step of compressing contains at least 25 reference points.

21. The method according to claim 15 wherein the step of further compressing and performing pattern recognition performs pattern recognition on each of the plurality of streams of initially compressed image data with the initially compressed external patterns, which initially compressed external patterns each corresponds to one of the external patterns used in the step of compressing.

22. The method according to claim 15 wherein the step of further compressing and performing pattern recognition performs pattern recognition on each of the plurality of streams of initially compressed image data with the initially compressed external patterns, which initially compressed external patterns do not correspond to the external patterns used in the step of compressing.

23. The method according to claim 1 wherein the step of compressing and pattern recognition is performed on a single processor that operates on multiple processor threads.

24. The method according to claim 23 wherein the step of further compressing and pattern recognition is performed on a single processor that operates on multiple processor threads.

25. The method according to claim 1 further including the step of storing the further compressed stream of digital image data.

* * * * *